United States Patent
Tai et al.

(10) Patent No.: US 9,165,209 B2
(45) Date of Patent: Oct. 20, 2015

(54) APPARATUS AND METHOD FOR CALCULATING CUMULATIVE HISTOGRAM OF IMAGE

(71) Applicant: Samsung Electronics Co., Ltd., Suwon-si (KR)

(72) Inventors: Yong Min Tai, Gunpo-si (KR); Young Su Moon, Seoul (KR); Jung Uk Cho, Hwaseong-si (KR); Joon Hyuk Cha, Incheon (KR); Shi Hwa Lee, Seoul (KR); Hyun Sang Park, Cheonan-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 134 days.

(21) Appl. No.: 13/872,499

(22) Filed: Apr. 29, 2013

(65) Prior Publication Data
US 2014/0029851 A1    Jan. 30, 2014

(30) Foreign Application Priority Data
Jul. 24, 2012  (KR) .................. 10-2012-0080404

(51) Int. Cl.
*G06K 9/00*   (2006.01)
*G06K 9/46*   (2006.01)

(52) U.S. Cl.
CPC .......... *G06K 9/4642* (2013.01); *G06K 9/00228* (2013.01); *G06K 9/4647* (2013.01)

(58) Field of Classification Search
None
See application file for complete search history.

(56) References Cited

U.S. PATENT DOCUMENTS

| | | | | |
|---|---|---|---|---|
| 4,742,551 | A * | 5/1988 | Deering ........................ | 382/170 |
| 5,388,168 | A * | 2/1995 | Sakashita et al. ............. | 382/169 |
| 6,219,447 | B1 * | 4/2001 | Lee .............................. | 382/168 |
| 7,684,280 | B2 | 3/2010 | Jones et al. | |
| 7,949,186 | B2 * | 5/2011 | Grauman et al. ............. | 382/170 |
| 8,054,170 | B1 * | 11/2011 | Brandt et al. ................. | 340/453 |
| 2004/0024801 | A1 | 2/2004 | Hamilton et al. | |
| 2004/0068395 | A1 * | 4/2004 | Hady et al. ................... | 702/188 |
| 2006/0115150 | A1 * | 6/2006 | Gay-Bellile et al. .......... | 382/168 |
| 2008/0317317 | A1 * | 12/2008 | Shekhar et al. ............... | 382/131 |
| 2009/0105993 | A1 | 4/2009 | Jones | |
| 2013/0329076 | A1 * | 12/2013 | Shaw ......................... | 348/222.1 |

FOREIGN PATENT DOCUMENTS

| | | |
|---|---|---|
| JP | 6-139354 | 5/1994 |
| JP | 2948390 | 7/1999 |
| JP | 3046093 | 3/2000 |
| JP | 2006-227902 | 8/2006 |
| KR | 1993-7001780 | 6/1993 |
| KR | 1996-0030041 | 8/1996 |
| KR | 2000-0050571 | 8/2000 |
| KR | 10-2005-0008812 | 1/2005 |
| KR | 10-2009-0023306 | 3/2009 |

* cited by examiner

*Primary Examiner* — Li Liu
(74) *Attorney, Agent, or Firm* — Staas & Halsey LLP

(57) ABSTRACT

An apparatus and method for calculating a cumulative histogram of an image are provided. A cumulative histogram calculation apparatus may include a cumulative value selecting unit to select cumulative data obtained by accumulating input data, based on a number of combinations of the input data, and a loading unit to load the selected cumulative value in a corresponding bin of a histogram.

14 Claims, 7 Drawing Sheets

<Cumulative histogram calculation apparatus 200>

|  | Input 1 | Input 2 | Input 3 | Input 4 |
|---|---|---|---|---|
| 1 | X | X | X | X |
| 2 | O | X | X | X |
| 3 | X | O | X | X |
| 4 | X | X | O | X |
| 5 | X | X | X | O |
| 6 | O | O | X | X |
| 7 | O | X | O | X |
| 8 | O | X | X | O |
| 9 | X | O | O | X |
| 10 | X | O | X | O |
| 11 | X | X | O | O |
| 12 | O | O | O | X |
| 13 | O | O | X | O |
| 14 | O | X | O | O |
| 15 | X | O | O | O |
| 16 | O | O | O | O |

|  | 500MHz | 333MHz | 200MHz |
|---|---|---|---|
| Conventional | 9508 | 5088 | 4578 |
| New | 6909 | 4407 | 4178 |
| Gain | 27.3% | 13.3% | 8.7% |

APPARATUS AND METHOD FOR CALCULATING CUMULATIVE HISTOGRAM OF IMAGE

CROSS-REFERENCE TO RELATED APPLICATIONS

This application claims the priority benefit of Korean Patent Application No. 10-2012-0080404, filed on Jul. 24, 2012, in the Korean Intellectual Property Office, the disclosure of which is incorporated herein by reference.

BACKGROUND

1. Field

Example embodiments of the following description relate to an apparatus and method for calculating a cumulative histogram of an image, and more particularly, to a technology that may reduce hardware costs by applying a scheme of calculating a cumulative value obtained by accumulating data associated with a number of combinations of the input data and of selectively loading the calculated cumulative value in a corresponding bin of a histogram.

2. Description of the Related Art

A histogram is frequently used in an image processing field, and may be generated based on a predetermined reference in a part of or all of areas of an image.

In this instance, the predetermined reference refers to dividing a part of or all of the areas of the image into a finite number of bins, and corresponds to an x-axis of the histogram of the image. A value obtained by adding, to a corresponding bin, information indicated by pixels in an area of the image that generate the histogram refers to a value of a y-axis.

The above histogram may also be used to generate a feature point based on the image and to represent information on feature points neighboring the generated feature point, namely a descriptor.

For example, a scale-invariant feature transform (SIFT) algorithm is widely used in the image processing field, to match feature points, and may provide stable processing results. The SIFT algorithm may generate a descriptor of a feature point, and the descriptor may be represented using a histogram for a gradient of pixels in an area neighboring the feature point.

A histogram in the image processing field is widely used in real-time color correction, tone-mapping, and the like, and is representative of schemes of expressing a characteristic using a distribution of image information.

The above histogram may be generated and processed for all areas of an image, however, may be generated only for a predetermined area of the image.

A feature-based image matching scheme may be used in various image processing fields, for example, motion tracking, detection and recognition of an object or a face, restoration of three-dimensional (3D) space, synchronization of stereo images, and the like.

The feature-based image matching scheme may enable matching of feature points using at least two images, and may use the histogram using a descriptor representing properties of feature points.

To use the SIFT algorithm in high-speed processing of a high-quality, high-capacity image, processing using hardware may be required due to complexity of the SIFT algorithm. In this instance, when a histogram of a predetermined area of an image, for example a descriptor, is generated, when the histogram is implemented using hardware, an adder may be used as a structure allocated to a predefined bin, based on a size of an area.

SUMMARY

In an aspect of one or more embodiments, there is provided a cumulative histogram calculation apparatus including a cumulative value selecting unit to select cumulative data obtained by accumulating input data, based on a number of combinations of the input data, and a loading unit to load the selected cumulative value in a corresponding bin of a histogram.

The cumulative value selecting unit may include a multiplexer (MUX), and the loading unit may include an accumulator. The MUX may selectively output the cumulative data and may enable the output cumulative data to be accumulated in the accumulator.

An interval of the bin may be changed in an exponential unit.

In an aspect of one or more embodiments, there is also provided a cumulative histogram calculation apparatus including an adding unit to generate output data corresponding to a number of combinations of input data from the input data, a multiplexing unit to receive the output data from the adding unit, and to selectively output the received output data, and an accumulating unit to accumulate the output data selectively output from the multiplexing unit, and to load a cumulative value obtained by accumulating the output data in a corresponding bin of a histogram.

The histogram may represent a characteristic using a distribution of image information for the input data.

The histogram may include information on feature points neighboring a feature point generated based on a result obtained by performing a scale-invariant feature transform (SIFT) operation on an image.

The multiplexing unit may be determined based on a size corresponding to a number of the input data.

In an aspect of one or more embodiments, there is also provided a cumulative histogram calculation method performed by a cumulative histogram calculation apparatus including at least one of at least one adder, at least one MUX, and at least one accumulator. The cumulative histogram calculation method may include generating, using the at least one adder, output data corresponding to a number of combinations of input data from the input data, receiving, using the at least one MUX, the output data from the at least one adder, and selectively outputting the received output data, and accumulating, using the at least one accumulator, the output data selectively output from the at least one MUX, and loading a cumulative value obtained by accumulating the output data in a corresponding bin of a histogram.

The histogram may represent information on feature points neighboring a feature point generated based on a result obtained by performing a SIFT operation on an image.

In accordance with one or more embodiments, there is provided a cumulative histogram calculation method including selecting cumulative data obtained by accumulating input data, based on a number of combinations of the input data using at least one multiplexer; and loading the accumulated data in a corresponding bin of a histogram.

In accordance with one or more embodiments, there is provided a cumulative histogram calculation apparatus including a plurality of multiplexers to selectively output data corresponding to a number of combinations of input data; and an accumulator to accumulate the output data selectively output from the plurality of multiplexers, and to load a cumulative value obtained by accumulating the output data in a corresponding bin of a histogram.

According to an aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of example embodiments, taken in conjunction with the accompanying drawings of which:

FIG. 5 illustrates a diagram of combinations of input data that may be input to an accumulator according to example embodiments;

FIG. 6 illustrates a diagram to explain an effect expected in a processor that is operated at a high speed, according to example embodiments.

DETAILED DESCRIPTION

Figure 1:
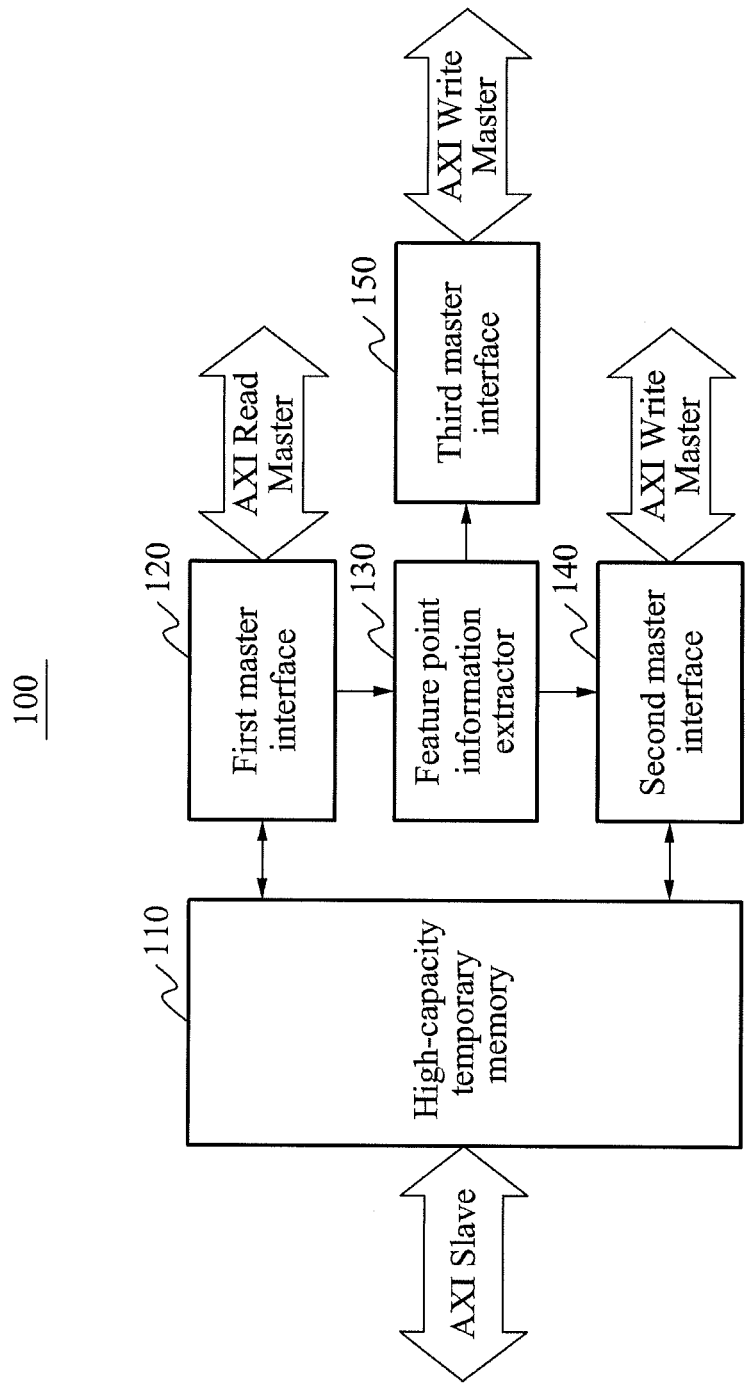
FIG. 1 illustrates a diagram of a feature point information extracting apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a diagram of a feature point information extracting apparatus according to example embodiments.

Referring to FIG. 1, a feature point information extracting apparatus 100 may include a first master interface 120, and a feature point information extractor 130. The first master interface 120 may output at least one first source image stored in a high-capacity temporary memory 110. The feature point information extractor 130 may receive the at least one first source image from the first master interface 120, and may extract feature point information from the received at least one first source image.

For example, the high-capacity temporary memory 110 may be a type of a random access memory (RAM) such as a dynamic random access memory (DRAM) that is typically used as a memory in a computing device, such as a computer and the like.

For example, the first master interface 120 may divide the at least one first source image based on a horizontal resolution or a vertical resolution of the at least one first source image, and may output the divided at least one first source image to the feature point information extractor 130.

The feature point information extracted by the feature point information extractor 130 may be a descriptor.

The descriptor may correspond to a feature point generated from an image, and may be feature point information on feature points neighboring the feature point.

To generate a descriptor, the feature point information extractor 130 may include a cumulative histogram calculation apparatus. An example of the cumulative histogram calculation apparatus will be further described with reference to FIG. 2.

The third master interface 150 may be a master interface to store the extracted feature point information, namely the descriptor, in a DRAM and the like, and an external high-capacity static random access memory (SRAM) buffer and the like.

The feature point information extractor 130 may extract, as the feature point information, at least one of a position of a feature point of at least one first source image and a descriptor corresponding to the position of the feature point.

To generate the position of the feature point and to generate the descriptor corresponding to the position of the feature point from the at least one first source image, the feature point information extractor 130 may use a scale-invariant feature transform (SIFT) algorithm.

A histogram may be used to generate a feature point based on an image, and to represent a descriptor, namely, information on feature points neighboring the generated feature point.

Specifically, the feature point information extractor 130 may determine the received at least one first source image to be at least one first octave.

Additionally, the feature point information extractor 130 may perform a convolution operation on the at least one first octave using a Gaussian filter, and may generate a first candidate feature point from difference(s) between or among Gaussian images generated in the first octave.

In addition, the feature point information extractor 130 may generate a second candidate feature point using Gaussian filter from difference(s) between or among Gaussian images generated in a second octave.

The feature point information extractor 130 may generate candidate feature points by distinguishing the first octave from the second octave a predetermined number of times, and may extract feature point information from the generated candidate feature points.

In other words, the feature point information extractor 130 may determine the received at least one first source image to be one first octave, and may determine a first candidate feature point from the first octave.

Subsequently, the feature point information extractor 130 may downsize the first octave, to generate a reduced image.

The feature point information extractor 130 may read a second source image from the reduced image, to generate a second octave.

Figure 2:
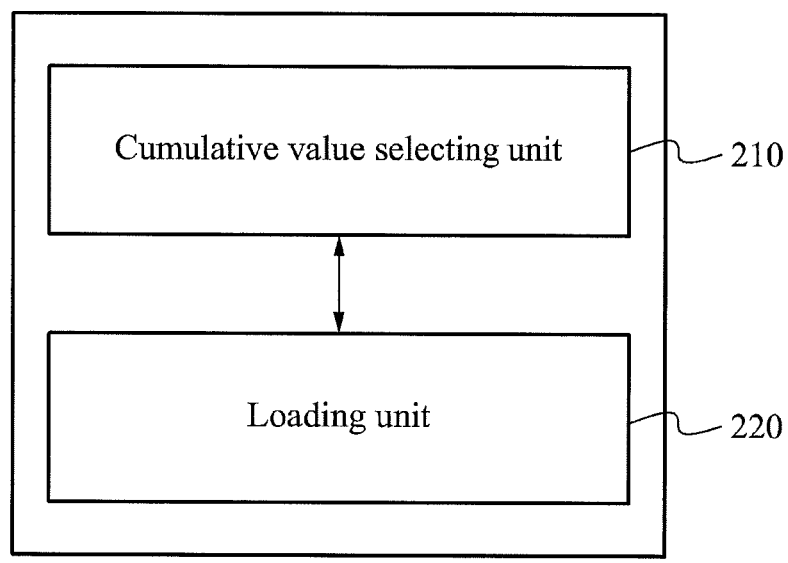
FIG. 2 illustrates a block diagram of a cumulative histogram calculation apparatus according to example embodiments.

FIG. 2 illustrates a block diagram of a cumulative histogram calculation apparatus 200 according to example embodiments.

The cumulative histogram calculation apparatus 200 of FIG. 2 may be included in a feature point information extractor 130 according to example embodiments, or may be implemented as separate, independent hardware.

The cumulative histogram calculation apparatus 200 may divide a part of or all of areas of an image into a finite number of bins, and may generate a histogram. For example, an interval of a bin in which a selected cumulative value is loaded may be changed in an exponential unit.

The histogram may be used to generate a feature point of an image and to represent information on feature points neighboring the generated feature point, namely, a descriptor.

The cumulative histogram calculation apparatus 200 may include a cumulative value selecting unit (cumulative value selector) 210, and a loading unit (loader) 220.

The cumulative value selecting unit 210 may select cumulative data obtained by accumulating input data, based on a number of combinations of the input data.

In other words, the cumulative value selecting unit 210 may calculate a cumulative value obtained by accumulating data associated with the number of combinations of the input data.

Subsequently, the loading unit 220 may load the selected cumulative value in a corresponding bin of a histogram.

Specifically, the loading unit 220 may be implemented by a scheme of selectively loading the cumulative value from the cumulative value selecting unit 210 in the corresponding bin of the histogram.

For example, the cumulative value selecting unit 210 may include a multiplexer (MUX), to accumulate the data associated with the number of combinations of the input data.

Additionally, the loading unit 220 may include an accumulator.

In this example, the MUX may selectively output the cumulative data, and may enable the output cumulative data to be accumulated in the accumulator.

The generated histogram may be used to represent a characteristic using a distribution of image information used in real-time color correction, tone-mapping, and the like.

The above histogram may be generated and processed for all areas of an image, however, may be generated only for a predetermined area of the image.

As described in FIG. 1, a feature-based image matching scheme may be used in various image processing fields, for example, motion tracking, detection and recognition of an object or a face, restoration of three-dimensional (3D) space, synchronization of stereo images, and the like.

The feature-based image matching scheme may enable matching of feature points using at least two images, and may use the histogram with respect to a descriptor representing properties of feature points.

For example, a feature point computed using the SIFT algorithm may be stored by determining a position of a feature point from an image and using the histogram for a descriptor, namely, information on feature points neighboring the feature point.

To use the SIFT algorithm in high-speed processing of a high-quality, high-capacity image, processing using hardware may be required due to complexity of the SIFT algorithm. In this instance, when a histogram of a predetermined area of an image, for example a descriptor of the SIFT algorithm, is generated, when the histogram is implemented using hardware, an adder may be used as a structure allocated to a predefined bin, based on a size of an area, which may result in higher costs.

The cumulative histogram calculation apparatus 200 may reduce a waste of costs to be incurred, by using only a minimum number of adders in the cumulative value selecting unit 210 and the loading unit 220.

Specifically, when a plurality of inputs are simultaneously received, the cumulative histogram calculation apparatus 200 may simplify costs for an adder tree, and may reduce hardware costs.

Additionally, the cumulative histogram calculation apparatus 200 may implement a hardware structure with a scheme of calculating a cumulative value obtained by accumulating data associated with a number of combinations of input data and of selectively loading the cumulative value in a corresponding bin of a histogram. Thus, it is possible to reduce a total cost.

Figure 3:
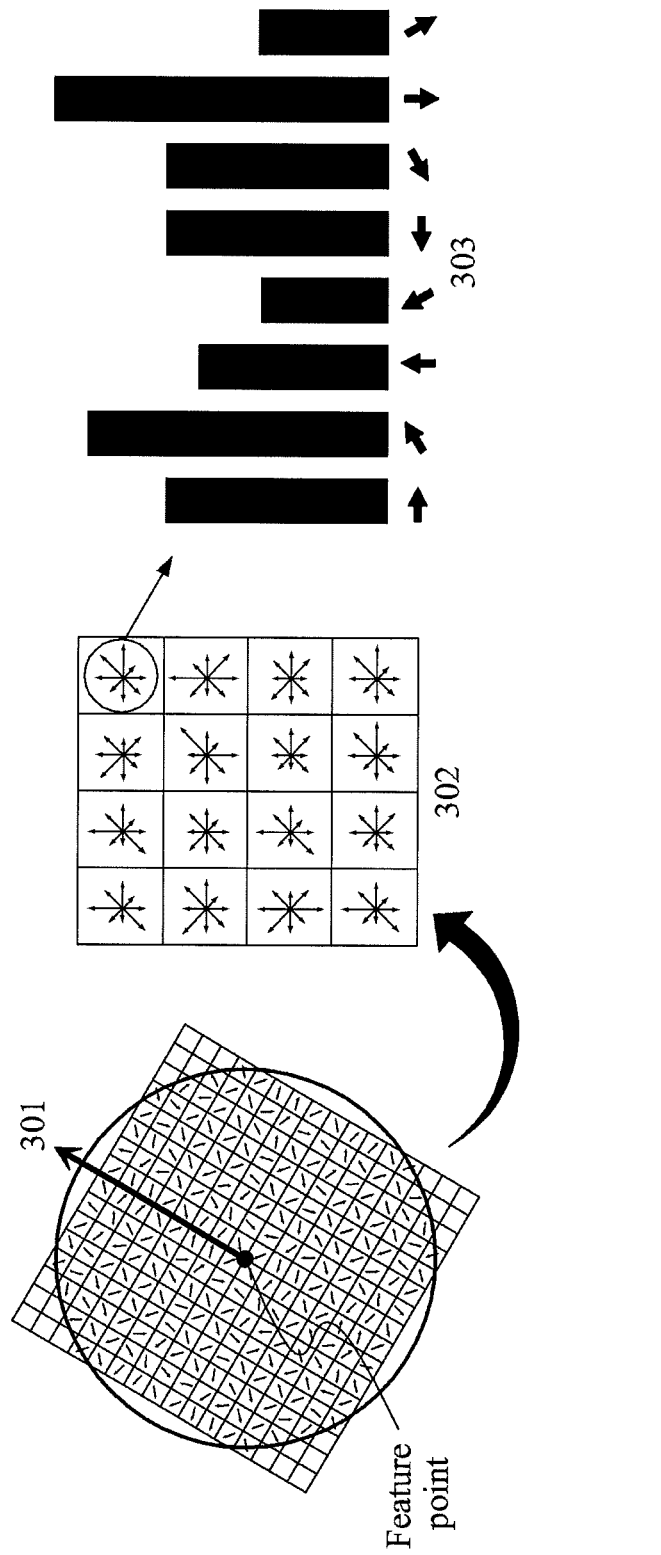
FIG. 3 illustrates a diagram of a histogram for a predetermined area of an image, and an operation of calculating a descriptor according to example embodiments.

FIG. 3 illustrates a diagram of a histogram for a predetermined area of an image, and an operation of calculating a descriptor according to example embodiments.

A descriptor of a SIFT algorithm may be a data set representing feature points neighboring a SIFT feature point 301.

A cumulative histogram calculation apparatus according to example embodiments may form a group of '4×4' pixels among '16×16' pixels neighboring the SIFT feature point 301, using a cumulative value loaded in a corresponding bin of a histogram 302, and may generate the histogram 302 for eight directions.

The generated histogram 302 may be computed as a feature vector 303.

In FIG. 3, an x-axis representing the feature vector 303 may indicate each of the eight directions included in the generated histogram 302, and a y-axis may be a size of a cumulative value associated with each of the eight directions.

In other words, the cumulative histogram calculation apparatus may use, as a descriptor, 16 8-direction components for a histogram (16*8=128 dimensions).

Figure 4:
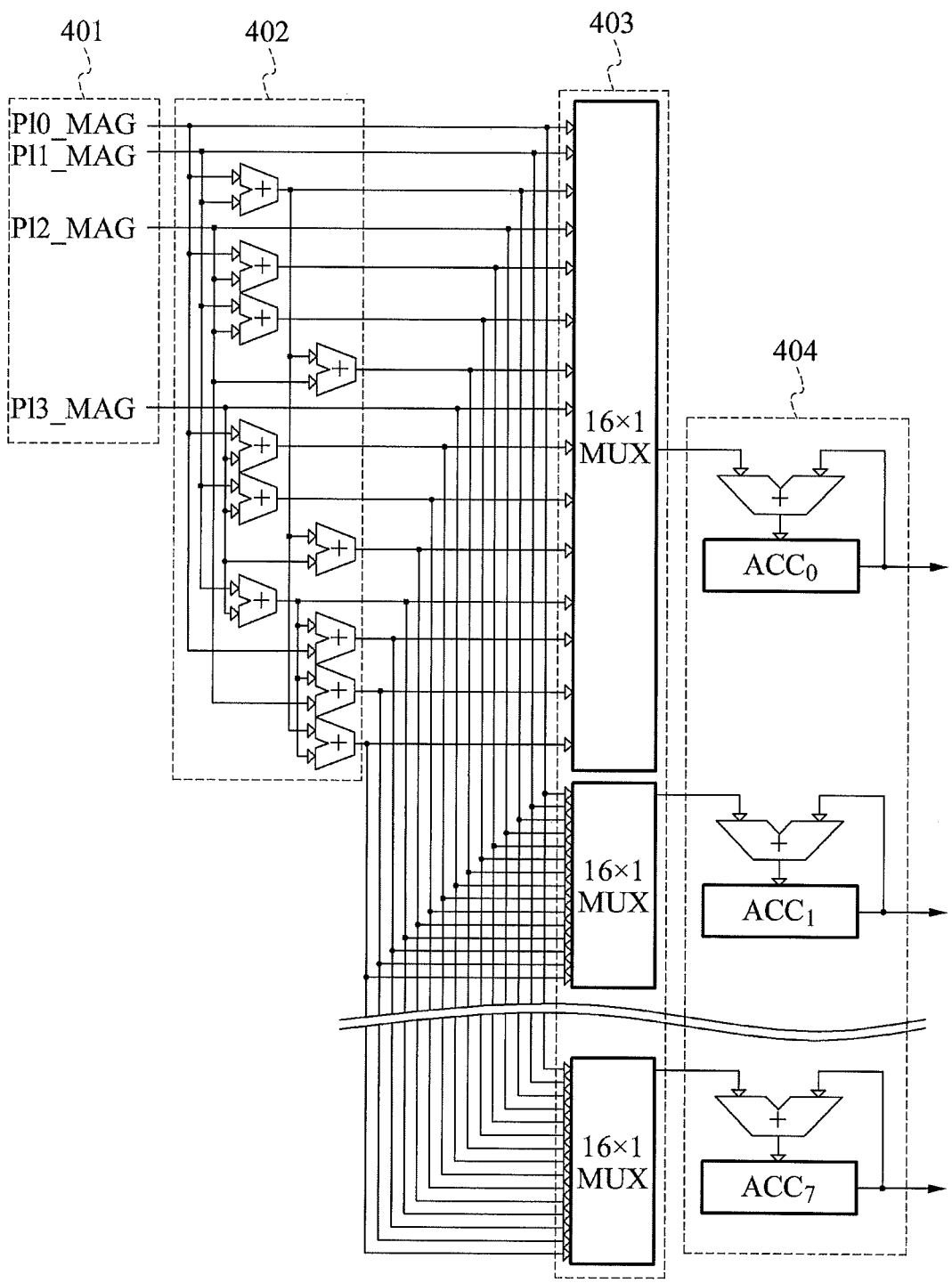
FIG. 4 illustrates a circuit diagram of a cumulative histogram calculation apparatus according to example embodiments.

FIG. 4 illustrates a circuit diagram of a cumulative histogram calculation apparatus 400 according to example embodiments.

Referring to FIG. 4, the cumulative histogram calculation apparatus 400 may include an adding unit (adder) 402, a multiplexing unit (multiplexers) 403, and an accumulating unit (accumulator) 404.

The adding unit 402 may generate output data corresponding to a number of combinations of input data 401 from the input data 401.

Conventionally, to generate a histogram for '4×4' pixel areas in an image, a structure of four pieces of data (namely, a 4×1 column vector) that is a vertical pixel reference is used as an input, and four adders are required for each accumulator.

Additionally, when a MUX is mounted in a front end of each of adders, and when input data corresponds to a bin corresponding to an accumulator, the input data was transferred. In other words, when four inputs for '4×4' pixel areas in an image are simultaneously received, a total of 32 adders were required to generate a histogram.

Due to a large number of adders, costs required for hardware may be increased, and an operation time may be delayed.

The cumulative histogram calculation apparatus 400 may reduce hardware costs by reducing a number of adders.

The cumulative histogram calculation apparatus 400 may calculate a number of combinations of input data in the adding unit 402.

Additionally, the multiplexing unit 403 may receive the output data from the adding unit 402, and may selectively output the output data.

MUXs included in the multiplexing unit 403 may be connected to accumulators in the accumulating unit 404, respectively.

The accumulating unit 404 may accumulate the output data output from the multiplexing unit 403, and may load a cumulative value obtained by accumulating the output data in a corresponding bin of a histogram.

The histogram may refer to information representing a characteristic using a distribution of image information for the input data.

For example, when a module used to generate a histogram for a part of areas of an image is implemented as hardware, a histogram may be generated by simultaneously receiving a plurality of inputs, for improvement of an operation speed. In this instance, costs for the hardware may be incurred, however, improvement of an operation speed in an example of an appropriate number of input data may be regarded to be more important than the costs for the hardware.

However, to reduce increased hardware costs as much as possible, the cumulative histogram calculation apparatus 400 may be used.

Conventionally, when four pieces of data are assumed to be input, four MUXs are required in an input end of an accumulator corresponding to each bin, in order to determine whether the four pieces of data are included in each bin.

Additionally, four adders are required to add the four pieces of data output from the four MUXs to the accumulator. As a result, when four pieces of data are simultaneously received, a total of 32 adders need to be used.

Since four adders are required for each accumulator, hardware costs may be incurred, and an operation time may be delayed. To improve an operation speed, a pipeline register may be required to be inserted in an adder tree of all accumulators. However, due to insertion of the pipeline register, a total cost for implementation may be increased.

Conversely, the cumulative histogram calculation apparatus 400 according to example embodiments may calculate all data associated with a number of combinations of input data, and may use the calculated data.

When four inputs are received, 16 combinations may be transferred to a single accumulator. In other words, when a '16×1' MUX is used, 16 combinations may be selectively transferred to a corresponding accumulator.

For example, 16 combinations of input data may be transferred to a predetermined accumulator, as shown in Table 500 of FIG. 5.

FIG. 5 illustrates a diagram of combinations of input data that may be input to an accumulator according to example embodiments.

In the table 500 of FIG. 5, each of input values, for example inputs 1, 2, 3 and 4, may be represented as two types of data, namely, 'O' and 'X', and accordingly a combination of the input values may be represented as '$2^N$'. As shown in the table 500, $2^4$, namely, 16 combinations of the four inputs may be input to an accumulator.

The above structure may require a unique MUX for each accumulator, and a 4-bit selection signal for an accumulator corresponding to an N-th bin may be defined as follows:

Sel_N[0]=(PI0_IDX==N)
Sel_N[1]=(PI1_IDX==N)
Sel_N[2]=(PI2_IDX==N)
Sel_N[3]=(PI3_IDX==N)

PI0_IDX, PI1_IDX, PI2_IDX, and PI3_IDX may indicate 1-bit signals input to four MUXs in an existing histogram, and may be used as a 4-bit signal and as a selection signal of a '16×1' MUX. Based on a selection signal, a value corresponding to an N-th accumulator may be added.

FIG. 6 illustrates a diagram to explain an effect expected in a processor that is operated at a high speed, according to example embodiments.

As described above, since a conventional technology implemented as hardware requires a plurality of adders for an accumulator, costs to implement the hardware may be incurred.

Additionally, the conventional technology may cause a delay in an operation time due to the plurality of adders.

To improve an operation speed, a pipeline register is required to be inserted in an adder tree of all accumulators. However, due to insertion of the pipeline register, a total cost for implementation may be increased.

When a cumulative histogram calculation apparatus according to example embodiments is used, costs for an adder tree may be simplified, and thus it is possible to reduce hardware costs.

The cumulative histogram calculation apparatus according to example embodiments may define a single adder tree only, and may select and accumulate operation data suitable for a bin in each accumulator, using a MUX, and accordingly an operation cost associated with an adder may be sharply reduced.

For example, four inputs may be assumed to be received simultaneously. In other words, in a logic device used for implementation, a total number of adders may be reduced from 32 to 19, and 32 '2×1' MUXs may be replaced by 8 '16×1' MUXs.

When gate counts synchronized in various operation frequencies using the above change are compared, a table 600 of FIG. 6 may be obtained.

As shown in the table 600, as an operation speed of a processor increases, costs for hardware in a cumulative histogram calculation apparatus according to example embodiments may be noticeably reduced.

Specifically, assuming that four inputs are received simultaneously, when a total of 32 adders are conventionally used in a processor operated at a clock of 200 Megahertz (MHz), a gate count may indicate 4578. When the cumulative histogram calculation apparatus is applied and when a total of 19 adders are used, a gate count may indicate 4178, that is, a gain of about 8.7% may be expected.

Similarly, assuming that four inputs are received simultaneously, when a total of 32 adders are conventionally used in a processor operated at a clock of 500 MHz, a gate count may indicate 9508. When the cumulative histogram calculation apparatus is applied and when a total of 19 adders are used, a gate count may indicate 6909, that is, a gain of about 27.3% may be expected.

Therefore, as an operation speed of a processor increases, costs for hardware in the cumulative histogram calculation apparatus according to example embodiments may be noticeably reduced.

For reference, assuming that four inputs are received simultaneously, when a total of 32 adders are conventionally used in a processor operated at a clock of 333 MHz, a gate count may indicate 5088. When the cumulative histogram calculation apparatus is applied and when a total of 19 adders are used, a gate count may indicate 4407, that is, a gain of about 13.3% may be expected.

The table 600 may indicate that it is suitable to implement an algorithm, such as a SIFT algorithm, since a part into which a pipeline register is inserted is relatively severely limited when an operation is realized at an ultrahigh speed.

As a result, by using a cumulative histogram calculation apparatus according to example embodiments, costs for an adder tree may be simplified, when a histogram is implemented using hardware and when a plurality of inputs are simultaneously input. Thus, hardware costs may be reduced.

Additionally, by using the cumulative histogram calculation apparatus according to example embodiments, it is possible to provide a hardware structure with a scheme of calculating a cumulative value obtained by accumulating data associated with a number of combinations of input data and of selectively loading the cumulative value in a corresponding bin of a histogram.

Figure 7:
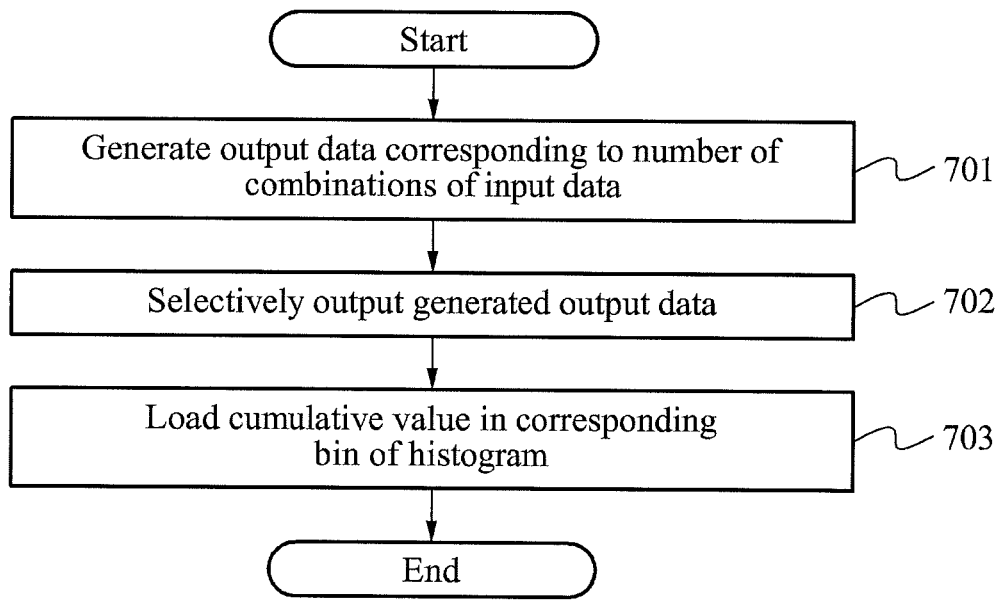
FIG. 7 illustrates a flowchart of a cumulative histogram calculation method according to example embodiments.

FIG. 7 illustrates a flowchart of a cumulative histogram calculation method according to example embodiments.

The cumulative histogram calculation method of FIG. 7 may be performed by a cumulative histogram calculation apparatus including at least one of at least one adder, at least one MUX, and at least one accumulator.

In 701, output data corresponding to a number of combinations of input data may be generated from the input data. Specifically, the output data may be generated using the at least one adder.

In 702, the generated output data may be selectively output.

Specifically, using the at least one MUX, the output data may be received from the at least one adder, and the received output data may be selectively output.

In 703, a cumulative value obtained by accumulating the output data output from the at least one MUX may be loaded in a corresponding bin of a histogram.

Specifically, using the at least one accumulator, the output data selectively output from the at least one MUX may be accumulated, and the cumulative value may be loaded in a corresponding bin of the histogram, and accordingly a descriptor of the histogram may be generated.

Therefore, by using the cumulative histogram calculation method, a cumulative value obtained by accumulating data associated with a number of combinations of input data may be calculated, and may be selectively loaded in a corresponding bin of a histogram. Thus, it is possible to simplify hardware used to implement a histogram, and possible to reduce costs for the hardware.

The methods according to the above-described example embodiments may be recorded in non-transitory computer-readable media including program instructions (computer readable instructions) to implement various operations embodied by a computing device such as a computer. The computing device may have one or more processors. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computing device using an interpreter. The computer-readable media may also be a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA). The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A cumulative histogram calculation apparatus, comprising a processor
    to select cumulative data from a plurality of input data simultaneously received, based on a number of combinations of the plurality of input data; and
    to load the selected cumulative data in a corresponding bin of a histogram,
    wherein the processor selects the cumulative data based on selecting an output of multiplexers having a $2^N$ input,
    wherein the $2^N$ input is combined with N input data simultaneously received, and
    wherein N is an integer greater than zero.

2. The cumulative histogram calculation apparatus of claim 1,
    wherein the processor selectively enables the output cumulative data to be accumulated in an accumulator to provide a selected cumulative value.

3. The cumulative histogram calculation apparatus of claim 1, wherein an interval of the bin is changed in an exponential unit.

4. A cumulative histogram calculation apparatus, comprising a processor
    to generate output data corresponding to a number of combinations of a plurality of input data simultaneously received,
    to receive the output data, and to selectively output the received output data, and
    to accumulate the output data selectively output and load a cumulative value obtained by accumulating the output data in a corresponding bin of a histogram,
    wherein the processor generates the output data based on selecting an output of multiplexers having a $2^N$ input,
    wherein the $2^N$ input is combined with N input data simultaneously received, and
    wherein N is an integer greater than zero.

5. The cumulative histogram calculation apparatus of claim 4, wherein the histogram comprises information representing a characteristic using a distribution of image information for the input data.

6. The cumulative histogram calculation apparatus of claim 5, wherein the histogram comprises information on feature points neighboring a feature point generated based on a result obtained by performing a scale-invariant feature transform (SIFT) operation on an image.

7. A cumulative histogram calculation method performed by a cumulative histogram calculation apparatus comprising at least one adder, at least one multiplexer (MUX), and at least one accumulator, the cumulative histogram calculation method comprising:
    generating, using the at least one adder, output data corresponding to a number of combinations of a plurality of input data simultaneously received;
    receiving, using the at least one MUX, the output data from the at least one adder, and selectively outputting the received output data; and
    accumulating, using the at least one accumulator, the output data selectively output from the at least one MUX, and loading a cumulative value obtained by accumulating the output data in a corresponding bin of a histogram,
    wherein the MUX has a $2^N$ input,
    wherein the $2^N$ input is combined with N input data simultaneously received, and
    wherein N is an integer greater than zero.

8. The cumulative histogram calculation method of claim 7, wherein the histogram comprises information on feature points neighboring a feature point generated based on a result obtained by performing a scale-invariant feature transform (SIFT) operation on an image.

9. At least one non-transitory computer readable recording medium storing computer readable instructions to control at least one processor to implement the cumulative histogram calculation method of claim 7.

10. A cumulative histogram calculation method comprising:
 selecting cumulative data from a plurality of input data simultaneously received, based on a number of combinations of the plurality of input data using at least one multiplexer; and
 loading the accumulated data in a corresponding bin of a histogram,
 wherein the multiplexer having a $2^N$ input selects the cumulative data based on selecting an output of the multiplexer,
 wherein the $2^N$ input is combined with N input data simultaneously received, and
 wherein N is an integer greater than zero.

11. The cumulative histogram calculation method of claim 10, wherein the histogram comprises information on feature points neighboring a feature point generated based on a result obtained by performing a scale-invariant feature transform (SIFT) operation on an image.

12. At least one non-transitory computer readable recording medium storing computer readable instructions to control at least one processor to implement the cumulative histogram calculation method of claim 10.

13. A cumulative histogram calculation apparatus, comprising a processor
 to selectively output data corresponding to a number of combinations of a plurality of input data simultaneously received; and
 to accumulate the output data selectively output and to load a cumulative value obtained by accumulating the output data in a corresponding bin of a histogram,
 wherein the processor selectively output the data based on selecting an output of multiplexers having a $2^N$ input,
 wherein the $2^N$ input is combined with N input data simultaneously received, and
 wherein N is an integer greater than zero.

14. The cumulative histogram calculation apparatus of claim 13, wherein the histogram comprises information on feature points neighboring a feature point generated based on a result obtained by performing a scale-invariant feature transform (SIFT) operation on an image.

* * * * *